July 27, 1965        G. ANSELMO        3,197,227

SIDEWALK SKIMMER

Filed March 2, 1964

INVENTOR.
GENE ANSELMO 3,197,227
SIDEWALK SKIMMER
Gene Anselmo, 5402 Cloud Way, San Diego, Calif.
Filed Mar. 2, 1964, Ser. No. 348,586
1 Claim. (Cl. 280—87.01)

My invention generally relates to a sidewalk skimmer and more particularly to a child's play vehicle.

An object of my invention is to provide a device for use by children at play that is equipped with a platform and wheels or casters and that will provide great enjoyment because of the uncertain direction and movements of its ride.

Another object is to provide a device, of the type described, of low cost manufacture and simple design that is further provided with a means of stopping or braking the motion.

These together with other objects and advantages which will become apparent reside in the details of construction and operation as will be more fully described and claimed, reference being made to the accompanying drawing forming a part hereof, wherein like numerals refer to like parts throughout, and in which:

Figure 1:
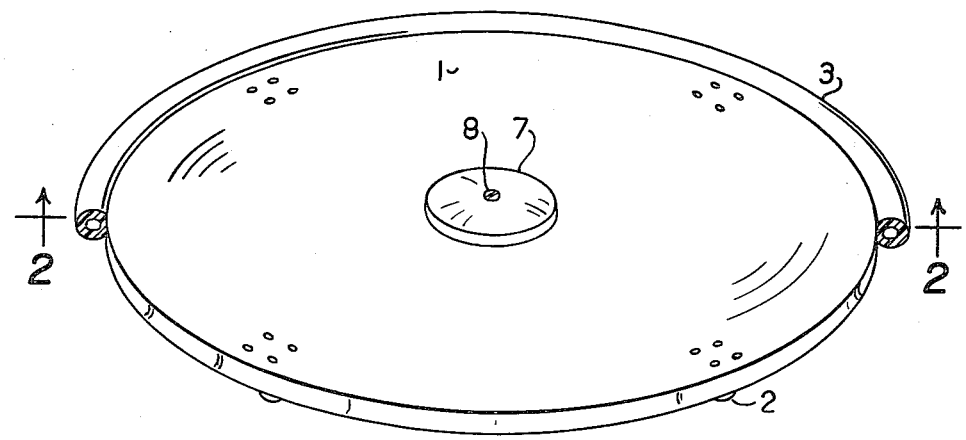
FIGURE 1 is a perspective view of my invention with a portion of the bumper ring broken away.
Figure 2:
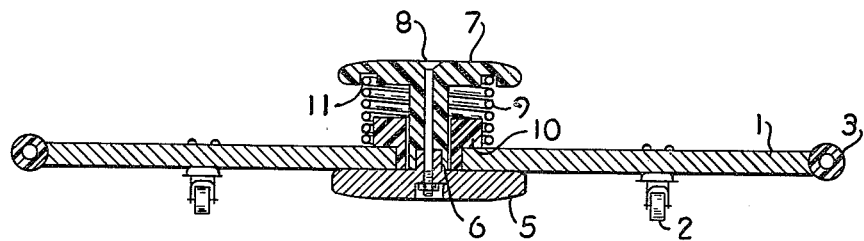
FIGURE 2 is a cross-sectional view, taken at 2—2 of FIGURE 1.

Referring specifically to the drawing, there is provided a generally round platform 1, a multiplicity of supportign swivel type caster rollers 2, four or more, equally spaced about or near the periphery and at the underside of platform 1.

At the outer edge of platform 1 is a complete circle of tubing 3, secured thereto, to act as a shock absorber or bumper.

At the center of platform 1 is provided a braking device consisting of a round, preferably wooden disc 5, having a round protruding portion 6, to fit into a hole provided into plastic, or other suitable material, handle part 7. The two parts, wooden disc 5, and plastic handle part 7, are assembled and secured together by bolt 8, to form a rigid spool shaped member, into this is assembled compression spring 9, pre-stressed to urge the spool-like member upward away from the ground surface. The spring 9 is retained in position at the bottom area by flanged bushing 10, and at the top by a groove 11, in handle part 7.

The bushing 10 further provides an elongated means of maintaining alignment and strength to the assembly.

In operation:

The rider or riders sit, stand, or otherwise board platform 1. The rider or riders may use the top round portion 7 as a means of holding on and may, if desired, stop the vehicle simply by pressing downward on the disc-like portion 7.

Downward travel of the disc-like portion 7 of the brake device is limited by the flange of bushing 10, so that injury to the fingers by crushing, between disc-like portion 7 and platform 1, is prevented.

The preferred embodiment of my invention herewith represented shows platform 1, as generally round. It is not my intention to limit this platform to any certain shape. It may be square, pentagon, hexagon, or any other generally regular shape.

It will be clear that the embodiment of the invention may be used in many ways as well as changed. Such changes will not effect the essence of the invention as described in the annexed claim.

What I claim as new is as follows:

In a child's play vehicle, comprising in combination, a generally flat platform having a plurality of caster-like supporting wheels located about the outer edge and having a braking device located at or near the center of said platform, the improved braking device comprising:

a friction disc disposed under an opening in the said platform, said friction disc having a center hub in said opening and a bore in the center of said center hub;

a circular brake handle disposed over said opening and said friction disc center hub, said circular brake handle having a center hub and bore in the center of said center hub, said friction disc center hub bore and said brake handle center hub bore being in axial alignment;

a bushing carried by said circular brake handle center hub and abutting said brake disc through said opening;

a coil spring carried by said bushing and being compressed between said platform and said circular brake handle; and a bolt inserted through said friction disc center hub bore and said circular brake handle hub bore for holding together the braking device.

References Cited by the Examiner

UNITED STATES PATENTS

| | | | |
|---|---|---|---|
| 887,812 | 5/08 | Johnson. | |
| 1,546,614 | 7/25 | Binsack | 280—87.01 |
| 2,136,019 | 11/38 | Pfau | 280—87.01 |
| 2,219,905 | 10/40 | Prickman | 280—12 |
| 2,448,427 | 8/48 | Gordon. | |
| 2,574,897 | 11/51 | Tantimonaco. | |
| 3,007,584 | 11/61 | Way | 280—79.1 X |

A. HARRY LEVY, *Primary Examiner.*

KENNETH H. BETTS, *Examiner.*